United States Patent
Fornof et al.

(10) Patent No.: US 7,789,925 B2
(45) Date of Patent: Sep. 7, 2010

(54) PURGE EXHAUST PROCESSOR

(75) Inventors: William P. Fornof, Girard, PA (US); Fred Hoffman, Columbia Station, OH (US); Leonard A. Quinn, Lagrange, OH (US); Randall W Nichols, Westlake, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 12/704,584

(22) Filed: Feb. 12, 2010

(65) Prior Publication Data
US 2010/0139487 A1 Jun. 10, 2010

Related U.S. Application Data

(63) Continuation of application No. 11/846,652, filed on Aug. 29, 2007, now Pat. No. 7,708,793.

(51) Int. Cl.
*B01D 50/00* (2006.01)

(52) U.S. Cl. .............. 55/385.3; 55/309; 55/385.1; 55/385.4; 55/418; 55/428; 55/429; 55/DIG. 25; 62/470; 95/278; 96/144

(58) Field of Classification Search ............. 55/309, 55/385.1, 385.3, 385.4, 418, 428, 429, DIG. 25; 62/470; 95/278; 96/144
See application file for complete search history.

(56) References Cited

U.S. PATENT DOCUMENTS

| | | | | |
|---|---|---|---|---|
| 2,272,926 A * | 2/1942 | Squiller | ...... | 418/90 |
| 3,796,025 A * | 3/1974 | Kasten | ...... | 96/136 |
| 4,050,237 A * | 9/1977 | Pall et al. | ...... | 60/39.08 |
| 4,487,617 A * | 12/1984 | Dienes et al. | ...... | 96/113 |
| 4,668,252 A * | 5/1987 | Gerdau | ...... | 96/189 |
| 4,898,599 A * | 2/1990 | Settlemyer | ...... | 95/92 |
| 6,574,986 B2 * | 6/2003 | Morimoto et al. | ...... | 62/470 |
| 2002/0131874 A1* | 9/2002 | Fornof et al. | ...... | 417/312 |
| 2002/0185009 A1* | 12/2002 | Schlaps | ...... | 96/413 |
| 2002/0189458 A1* | 12/2002 | Fornof et al. | ...... | 96/134 |
| 2003/0110949 A1* | 6/2003 | Fornof et al. | ...... | 96/136 |
| 2004/0016342 A1* | 1/2004 | Fornof et al. | ...... | 95/117 |
| 2007/0277485 A1* | 12/2007 | MacKenzie et al. | ...... | 55/424 |

* cited by examiner

*Primary Examiner*—Robert J Hill, Jr.
*Assistant Examiner*—Christopher P Jones
(74) *Attorney, Agent, or Firm*—Eugene E. Clair; Cheryl L. Greenly

(57) ABSTRACT

A purge exhaust processor includes an inlet chamber receiving a purge exhaust. A portion of the purge exhaust including at least one of moisture, air, and oil is passed from the inlet chamber to a sump volume. A heat source changes a phase of the moisture from liquid to gas. A wick transfers the oil from the sump volume to an oil collector.

8 Claims, 5 Drawing Sheets

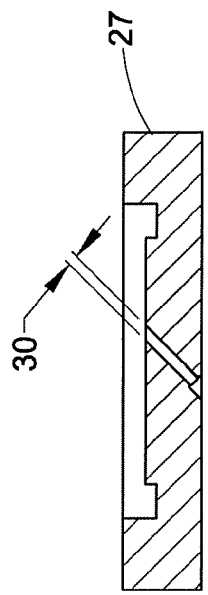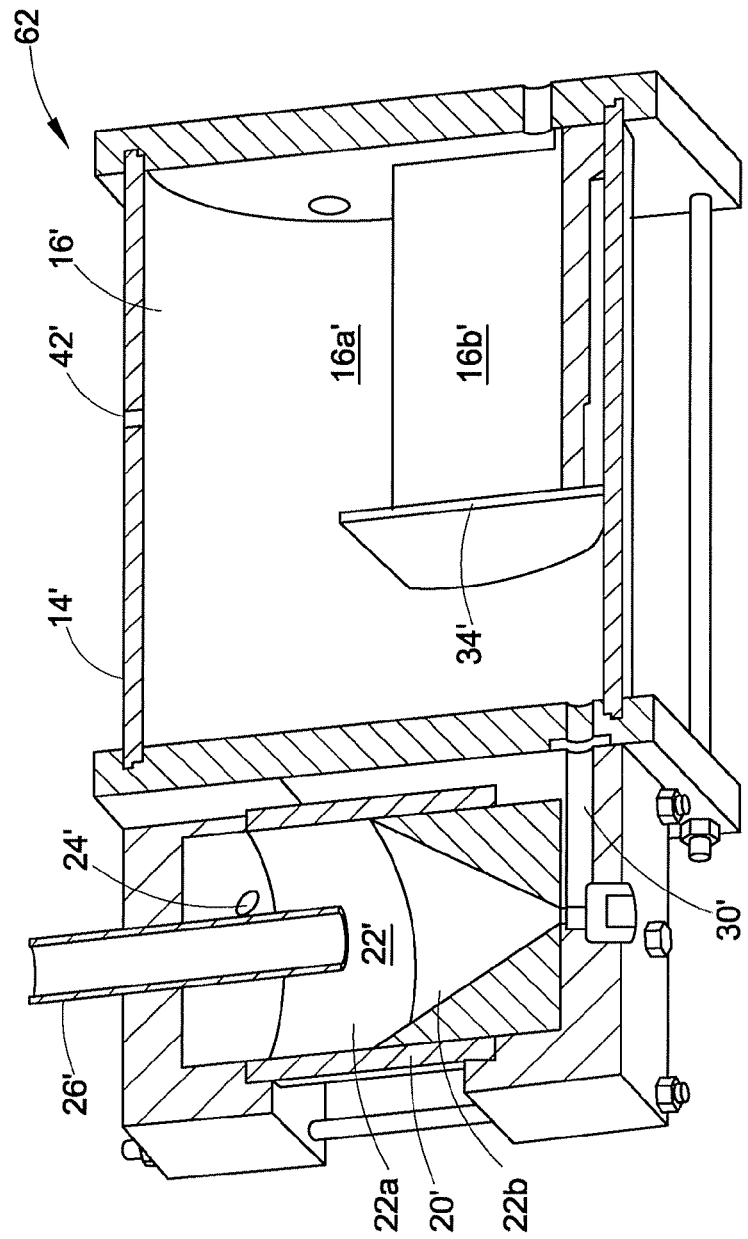
FIG. 2
FIG. 3

SPECIFY UNITS (U = US CUSTOMARY [IMPERIAL], M = METRIC)

|  |  |  | INPUT | WORKING |
|---|---|---|---|---|
| FLOW RATE | Q | cfm | 19.5 | 20 cfm |
| DESIGN INLET VEL | vi | fps | 50 | 50 fps |
| GAS DENSITY | rg | pcf | 0.0740 | 0.074 pcf |
| INLET AREA |  |  |  | 0.01 sf |
| PD PARAMETR |  |  |  | 0.56 in water |

DIMENSIONS

| | | | TYPE OF CYCLONE | | | | | |
|---|---|---|---|---|---|---|---|---|
| | | | STAIRMAND HE | SWIFT HE | LAPPLE LE | SWIFT LE | PERTERSON / WHITBY LE |
| DIA | D | ft | 0.25 | 0.27 | 0.23 | 0.23 | 0.23 |
| INLET HT | a | in | 1.53 | 1.40 | 1.37 | 1.37 | 1.62 |
| INLET WIDTH | b | in | 0.61 | 0.67 | 0.68 | 0.68 | 0.58 |
| OUTLET LENGTH | S | ft | 0.13 | 0.13 | 0.14 | 0.14 | 0.13 |
| OUTLET DIA | De | in | 1.53 | 1.27 | 1.37 | 1.37 | 1.39 |
| CYLINDER HT | h | ft | 0.38 | 0.37 | 0.46 | 0.40 | 0.31 |
| OVERALL HT | H | ft | 1.02 | 1.03 | 0.91 | 0.86 | 0.73 |
| DUST OUTLET DIA | B | in | 1.15 | 1.27 | 0.68 | 1.09 | 1.39 |
| #VEL HDS | Nh | | 5.14 | 4.87 | 4.49 | 4.69 | 4.77 |
| PRESS DROP, NO NV | | in water | 2.85 | 2.70 | 2.49 | 2.60 | 2.65 |
| PRESS DROP, WITH NV | | in water | 1.34 | 1.27 | 1.17 | 1.22 | 1.24 |

CYCLONE DATA FROM "NEW DESIGN APPROACH BOOSTS CYCLONE EFFICIENCY",
W.H. KOCH AND W. LICHT, CHEM ENG NOV 7 1977, 80
PRESSURE DROP VEL HEAD CORRELATION FROM "A BETTER WAY TO CALCULATE
CYCLONE PRESSURE DROP" J. CASAL AND J.M. MARTINEZ-BENET, CHEM ENG JAN 24, 1983, 99

FIG. 6

| | | | |
|---|---|---|---|
| 0.5 sec | 1.0 sec | | DURATION OF INITIAL PURGE |
| 39 | 19.5 | scfm | STANDARD AIR FLOW |
| 0 | 0 | psig | AIR PRESSURE |
| 14.7 | 14.7 | psia | AIR ABSOLUTE PRESSURE |
| 39.00 | 19.50 | acfm | ACTUAL VOLUMETRIC AIR FLOW |
| 1123.2 | 561.6 | in3/sec | CUBIC INCHES PER SECOND |
| 0.8 | 0.6 | inch | SLOT WIDTH |
| 2 | 1.5 | inch | SLOT LENGTH |
| 1600 | 0.900 | in2 | SLOT AREA |
| 702 | 624 | in/sec | AIR VELOCITY |
| 58.5 | 52.0 | ft/sec | AIR VELOCITY |
| 4 | 3 | inch | CYCLONE INSIDE DIAMETER |
| 6 | 5 | inch | CYCLONE LENGTH |
| 75.40 | 36.34 | in3 | CYCLONE VOLUME |
| 1.29 | 0.68 | sec | AIR RETENTION TIME |
| 1.6 | 1.2 | inch | MEAN AIR ROTATION RADIUS |
| 439 | 520 | rad/sec | ANGULAR VELOCITY |
| 4190 | 4966 | RPM | ROTATIONAL VELOCITY |
| 25667 | 27040 | ft/sec2 | CENTRIFUGAL FORCE |
| 798 | 840 | g | CENTRIFUGAL FORCE |

FIG. 7 under pressure into the inlet chamber 22 to create a cyclonic effect within the inlet chamber 22.

US 7,789,925 B2

PURGE EXHAUST PROCESSOR

RELATED APPLICATIONS

The present application is a continuation of U.S. application Ser. No. 11/846,652 "Purge Exhaust Processor," now U.S. Pat. No. 7,708,793 B2, filed on Aug. 29, 2007, the entire content of which is fully incorporated herein by reference.

BACKGROUND

The present invention relates to a compressed air dryer. It finds particular application in conjunction with reducing oil expelled to atmosphere when the air dryer is purged and will be described with particular reference thereto. It will be appreciated, however, that the invention is also amenable to other applications.

The purge exhaust of a compressed air regenerative dryer used on air braked vehicles normally consists of water mixed with trace amounts of oil. The oil may be introduced into the air dryer from the compressor. The water and oil are expelled from purge exhaust valve during a purge cycle of the air dryer. More specifically, the water and oil are expelled to atmosphere. Exhausting oil to atmosphere is undesirable. In addition, the oil tends to accumulate over time around the purge exhaust valve. This oil accumulation frequently leads customers to incorrectly believe the compressor is prematurely worn resulting in unnecessary compressor replacement.

Currently, compressed air condensate management separators including baffles and coalescing elements are used to separate oil and emulsions from the condensate water of industrial compressed air systems. However, these separators tend to be bulky and are typically designed for stationary industrial compressed air applications—not suitable to be mounted on motor vehicles.

The present invention provides a new and improved apparatus and method which addresses the above-referenced problems.

SUMMARY

In one aspect of the present invention, a purge exhaust processor includes an inlet chamber receiving a purge exhaust. A portion of the purge exhaust including at least one of moisture, air, and oil is passed from the inlet chamber to a sump volume. A heat source changes a phase of the moisture from liquid to gas. A wick transfers the oil from the sump volume to an oil collector.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIG. 2 illustrates an end-plate in accordance with one embodiment of an apparatus illustrating principles of the present invention;

FIG. 3 illustrates a purge exhaust processor in accordance with another embodiment of an apparatus illustrating principles of the present invention;

FIG. 6 presents various cyclone dimensions for a set input flow rate with a set inlet velocity and a set gas density; and FIG. 7 presents ranges of various parameters for both a 0.5 sec initial purge duration and a 1.0 sec initial purge duration.

DETAILED DESCRIPTION OF ILLUSTRATED EMBODIMENT

Figure 1:
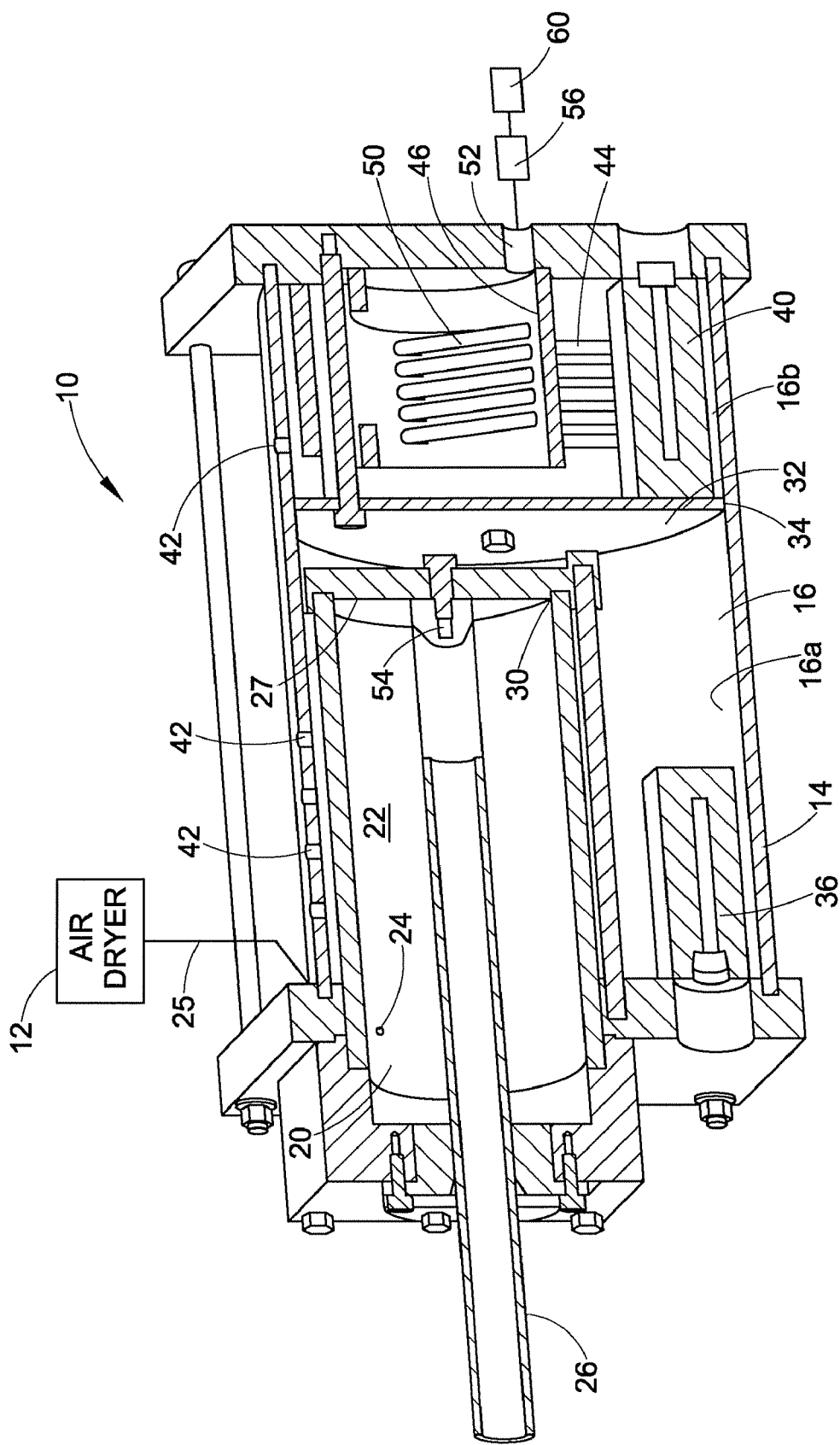
FIG. 1 illustrates a purge exhaust processor in accordance with one embodiment of an apparatus illustrating principles of the present invention.

With reference to FIG. 1, an exemplary separator 10 (purge exhaust processor) is illustrated for processing an exhaust from, for example, an associated air dryer 12 on a heavy vehicle. In one embodiment, the exhaust is expelled from the air dryer 12 during a purge cycle and, therefore, is referred to here as purge exhaust. The purge exhaust typically includes at least one of air, moisture, and oil.

The separator 10 includes a first housing 14, which defines a sump volume 16, and a second housing 20, which defines an inlet chamber 22. An inlet port 24 is included in the inlet chamber 22 for receiving the purge exhaust from the air dryer 12 via an air line 25. The inlet chamber 22 fluidly communicates with atmosphere via an air outlet port 26 (outlet tube). One end of the inlet chamber 22 is defined by an end-plate 27 having an inlet chamber passage 30, which provides fluid communication between the inlet chamber 22 and the sump volume 16. In the illustrated embodiment, the second housing 20 defining the inlet chamber 22 is positioned substantially within the first housing 14 defining the sump volume 16. However, other embodiments including other configurations (see, for example, FIG. 3) are also contemplated.

A divider 32 is positioned in the sump volume 16 to define a first sump sub-volume 16a and a second sump sub-volume 16b. A sump passage 34 is defined between the first and second sump sub-volumes 16a, 16b, respectively. In the embodiment illustrated in FIG. 1, the sump passage 34 is between an outer diameter of the divider 32 and an inner diameter of the first housing 14 defining the sump volume 16. A first heat source 36 (e.g., a heater or warming element) is positioned in the first sump sub-volume 16a, and a second heat source 40 (e.g., a heater or warming element) is positioned in the second sump sub-volume 16b. Orifices 42 in the first housing 14 act as vents in the sump volume 16.

An oleophilic filament 44 is positioned in the second sump sub-volume 16b. An internal oil collector 46 is positioned in the second sump sub-volume 16b for receiving oil from the oleophilic filament 44. In one embodiment, the oleophilic filament 44 is a polypropylene fiber (wick) that has an affinity for oil. A capillary action is created by an attraction between the oleophilic filament 44 and the oil. In one embodiment, a tubing 50 surrounds at least a portion of the oleophilic filament 44 and increases the capillary action between the oleophilic filament 44 and the oil for disengaging the oil from the wick 44.

An oil outlet port 52 in the first housing 14 provides a passage through the first housing 14 of the sump volume 16.

During use, when the associated air dryer 12 enters a purge cycle, the exhaust (e.g., purge exhaust) is transferred from a purge outlet port of the air dryer 12 to the inlet chamber 22 via the inlet port 24. The purge exhaust is typically expelled from the air dryer, and enters the inlet port 24, with a significant amount of force. In one embodiment, the inlet chamber 22 is configured to include a substantially cylindrical inner wall. In addition, the inlet port 24 is configured to introduce the purge exhaust into the inlet chamber 22 along a path that is substantially tangential to the inner wall of the inlet chamber 22. The purge exhaust is typically introduced into the inlet chamber 22 at a relatively high velocity. Therefore, a cyclonic or centrifugal force is created that swirls the purge exhaust along the inner wall of the inlet chamber 22. A spike 54 helps maintain a vortex of the cyclonic swirl centered in the inlet chamber 22.

The cyclonic swirl facilitates separating the relatively lighter material(s) (e.g., air) from the relatively heavier material(s) (e.g., moisture and oil) in the purge exhaust. A first portion of the exhaust including the relatively lighter material(s) (e.g., air) exits the inlet chamber 22 via the air outlet port 26 while a second portion of the exhaust including the relatively heavier material(s) (e.g., moisture and oil) is forced to inner walls of the inlet chamber 22.

The relatively heavier material(s) (e.g., moisture and oil) in the second portion of the purge exhaust are passed from the inlet chamber 22 to the sump volume 16 (e.g., the first sump sub-volume 16a) via the inlet chamber passage 30. In one embodiment, the inlet chamber passage 30 is angled (e.g., between about 25° and about 65°) in a direction away from the swirling exhaust. The angled inlet chamber passage 30 facilitates only passing the heavier materials (e.g., the moisture and oil) from the inlet chamber 22 to the sump volume 16. In addition, the materials passed from the inlet chamber 22 to the sump volume 16 is also determined as a function of a diameter of the inlet chamber passage 30 and a thickness of the end-plate 27. In that regard, a trade-off exists between an inlet chamber passage having a diameter that is too large—in which case too much air would escape from the inlet chamber 22—and a passage having a diameter that is too small—in which case the chance that the inlet chamber passage may become clogged with oil and/or moisture increases. With reference to FIG. 2, in one embodiment the inlet chamber passage 30 in the end-plate 27 is angled at about 45° from the swirling exhaust and has a diameter of about 0.12".

Once the moisture and oil are in the first sump sub-volume 16a, the first heater element 36 heats the moisture to change the phase of the moisture from liquid to gas. In other words, the first heater element 36 evaporates the moisture through, for example, boiling. The gaseous moisture is vented to atmosphere from the sump volume 16 via the orifices 42. At this point, substantial amounts of the air and moisture in the second portion of the purge exhaust have been eliminated, leaving substantially only the oil.

The remaining liquid from the purge exhaust (including mostly oil with some small amounts of air and moisture), passes from the first sump sub-volume 16a to the second sump sub-volume 16b via the sump passage 34. The second heater element 40 evaporates additional moisture from the purge exhaust. The additional gaseous moisture is vented to atmosphere from the sump volume 16 via the orifices 42. The oleophilic filament 44 transfers the oil from a bottom portion of the second sump volume 16b to the internal oil collector 46. More specifically, the oil is wicked-up by a first end of the oleophilic filament 44. The oil is then transferred from a second end of the oleophilic filament 44 onto the internal oil collector 46 via, for example, a dripping action.

The wicked-up oil is transferred from the internal oil collector 46 to an external oil collector 56, which is outside of the sump volume 16, through the oil outlet port 52 via, for example, gravity. Therefore, the oleophilic filament 44 acts as a means for transferring the oil from the sump volume 16 to the oil collectors 46, 56. The oil in the external oil collector 56 is disposed of in an environmentally proper manner. Alternatively, as discussed in more detail below, the oil in the external oil collector 56 is recycled to, for example, a compressor or crankcase 60 on the vehicle.

Because the first and second heating elements 36, 40 change the moisture in the purge exhaust from a liquid phase to a gaseous phase, the heating elements 36, 40 act as means for changing a phase of the moisture in the purge exhaust. The heating elements 36, 40 may be conventional electric heaters or may use or transfer heat generated by other vehicle systems to a suitable location in the sump areas.

With reference to FIG. 3, another embodiment of an exemplary separator 62 is illustrated for processing purge exhaust. For ease of understanding this embodiment of the present invention, like components are designated by like numerals with a primed (') suffix and new components are designated by new numerals.

In the embodiment illustrated in FIG. 3, the first housing 14', which defines the sump volume 16', and the second housing 20', which defines the inlet chamber 22', are in a side-by-side configuration (unlike the first embodiment illustrated in FIG. 1 in which the second housing 20 is positioned substantially within the first housing 14).

With reference to FIG. 3, a first portion 22a of the inlet chamber 22' is configured to include a substantially cylindrical inner wall while a second portion 22b of the inlet chamber 22' is configured to include angled inner walls. As in the embodiment discussed above, the inlet port 24' is configured to introduce the purge exhaust into the inlet chamber 22' along a path that is substantially tangential to the inner wall of the first portion 22a of the inlet chamber 22'. Therefore, a cyclonic or centrifugal force is created that swirls the purge exhaust along the inner wall of the first portion 22a of the inlet chamber 22'. The angled inner walls of the second portion 22b of the inlet chamber 22' help maintain a vortex of the cyclonic swirl centered in the inlet chamber 22'.

The cyclonic swirl facilitates separating the relatively lighter material(s) (e.g., air) from the relatively heavier material(s) (e.g., moisture and oil) in the purge exhaust. The first portion of the exhaust including the relatively lighter material(s) (e.g., air) exits the inlet chamber 22' via the air outlet port 26' while the second portion of the exhaust including the relatively heavier material(s) (e.g., moisture and oil) are forced to inner walls of the inlet chamber 22'.

The second portion of the exhaust including the relatively heavier material(s) (e.g., moisture and oil) is passed from the inlet chamber 22' to the sump volume 16' (e.g., the first sump sub-volume 16a') via the inlet chamber passage 30'. As in the embodiment illustrated in FIG. 1, once in the first sump sub-volume 16a', the first heater element (not shown in FIG. 3) evaporates moisture from the purge exhaust, and the gaseous moisture is vented to atmosphere from the sump volume 16' via the orifices 42'. At this point, substantial amounts of the air and moisture in the second portion of the purge exhaust have been eliminated, leaving substantially only the oil.

The remaining purge exhaust (including mostly oil with some small amounts of air and moisture), passes from the first sump sub-volume 16a' to the second sump sub-volume 16b' via the sump passage 34'. Because operation of the oleophilic filament is the same as described above with reference to the embodiment illustrated in FIG. 1, a cut-away view of the second sub-volume 16b' is not illustrated in FIG. 3. Once the oil is transferred by the oleophilic filament, the oil exits the second sump volume 16b' via the oil outlet port 52'.

Figure 4:
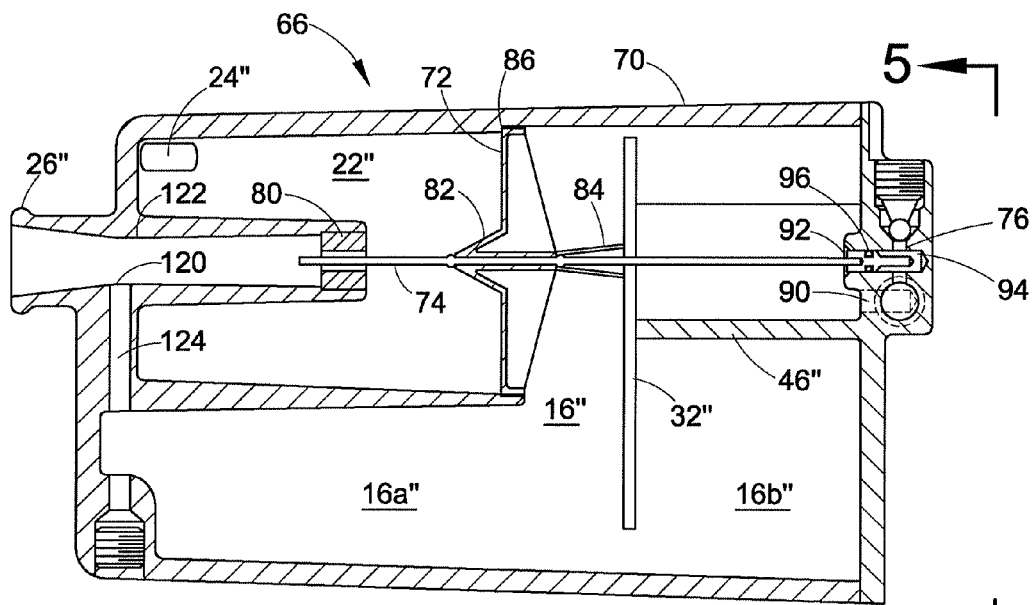
FIG. 4 illustrates a purge exhaust processor in accordance with another embodiment of an apparatus illustrating principles of the present invention.

With reference to FIG. 4, another embodiment of an exemplary separator 66 is illustrated for processing purge exhaust. For ease of understanding this embodiment of the present invention, like components are designated by like numerals from FIG. 1 with a double-primed (") suffix and new components are designated by new numerals.

With reference to FIG. 4, a housing 70 defines the inlet chamber 22" and the sump volume 16". In the illustrated embodiment, a movable piston 72 separates the inlet chamber 22" from the sump volume 16". A push-rod 74 extends in one direction from the piston 72, through the divider 32", and into an oil transfer (pump) orifice 76. The push-rod 74 extends in a second direction (which is substantially opposite to the first direction) from the piston 72 into a guide piece 80 in the air outlet port 26". As in the embodiment illustrated in FIG. 1, the inlet chamber 22" is configured to include a substantially cylindrical inner wall. In addition, the inlet port 24" is configured to introduce the purge exhaust into the inlet chamber 22" along a path that is substantially tangential to the inner wall of the inlet chamber 22". Therefore, a cyclonic or centrifugal force is created that swirls the purge exhaust along the inner wall of the inlet chamber 22". A spiked portion 82 of the movable piston 72 helps maintain a vortex of the cyclonic swirl centered in the inlet chamber 22". A biasing means 84 (e.g., a spring) biases the piston 72 into closed engagement with a seat 86 of the inlet chamber 22".

The piston 72/seat 86 interface creates a seal may or may not be airtight. If the piston 72/seat 86 interface is not airtight, the second portion of the exhaust may pass from the inlet chamber 22" to the sump volume 16" between the piston 72 and the seat 86. During use, the burst of purge exhaust in the inlet chamber 22" creates a swirl in the inlet chamber 22" to separate the relatively heavier material(s) (e.g., oil and moisture) from the relatively lighter material(s) (e.g., air). Pressure in the inlet chamber 22" created by the burst briefly moves the piston 72 away from the biased position in the seat 86 and toward the divider 32". While the piston 72 is unseated (open), the second portion of the exhaust including the oil and moisture are passed from the inlet chamber 22" to the first sump sub-volume 16a".

Although not illustrated in FIG. 4, it is to be understood that first and second heater elements evaporate the moisture in the first and second sump sub-volumes 16a", 16b", respectively, as described above with reference to the embodiment illustrated in FIG. 1. In addition, an oleophilic filament (not illustrated in FIG. 4) is used as described above to deposit the oil on the internal oil collector 46".

Figure 5:
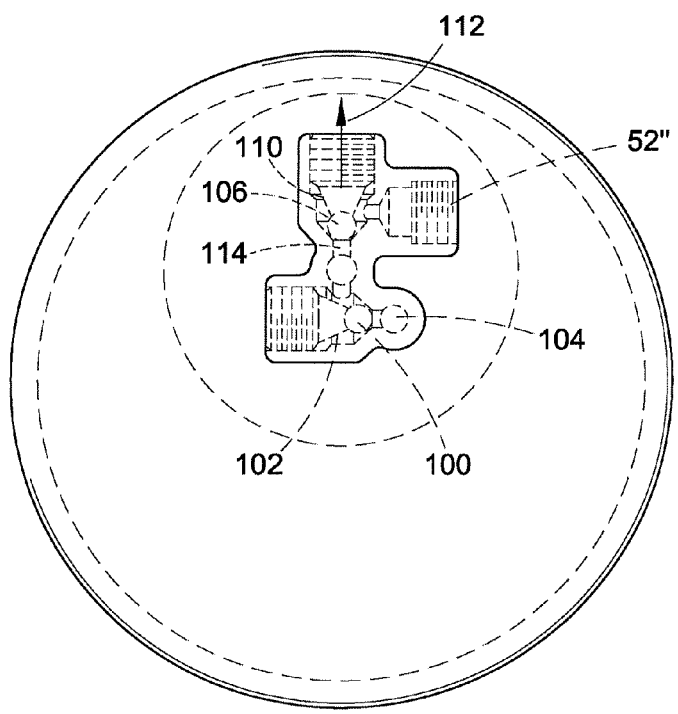
FIG. 5 illustrates a side view of the purge exhaust processor of FIG. 4 indicated along the line noted as "FIG. 5"

FIG. 5 illustrates a side view of the separator as indicated by the line noted as "FIG. 5" in FIG. 4. With reference to FIGS. 4 and 5, the oil passes from the internal oil collector 46" to a passage 90. As the piston 72 is moved by pressure in the inlet chamber 22", a tip 92 of the push-rod 74 is quickly pushed into and pulled from a cavity 94. A sealing means 96 (e.g., an o-ring) creates a seal around the push-rod 74 when the tip 92 is in the cavity 94. Pressure (e.g., air pressure) created by the tip 92 entering the cavity 94 causes a check valve 100, which is biased by a spring 102 to the illustrated position, to seat over a port 104 associated with the passage 90. At the same time, the pressure causes a check valve 106, which is biased by a spring 110 to the illustrated position, to be unseated in the direction of arrow 112. Oil in a channel 114 is then transferred (pumped) by the pressure to the oil outlet port 52". In one embodiment, the oil outlet port 52" leads to a compressor (not shown) on the vehicle. Oil transferred (pumped) to the compressor via the oil outlet port 52" is recycled to the compressor or engine. Alternatively, the oil is collected in a reservoir (not shown), which is periodically emptied.

In the illustrated embodiment, the air outlet port 26" includes an orifice 120 in a necked-down portion 122, which fluidly communicates with a moisture exhaust 124. The necked-down portion 122 creates a venturi effect that draws moisture from the exhaust passing through the air outlet port 26". It is to be understood that creating a venturi effect to draw moisture from the exhaust exiting the air outlet port 26" is an alternative to venting the moisture from the sump volume as described above with reference to FIGS. 1-3.

With reference to FIGS. 1 and 4, it is contemplated in one embodiment that the inlet port 24, 24" has a width between about 0.6" and 0.8" and a height between about 1.5" to about 2.0". In addition the inlet chamber 22, 22" has a length between about 5.0" and about 6.0" and a diameter between about 3.0" and about 4.0"; and the outlet tube 26, 26" has a diameter between about 1.5" and 2.0". The dimensions contemplated in this paragraph are arrived at according to calculations discussed below.

In general, cyclones operate in relatively steady states. In the purge type of intermittent and short duration operation, some assumptions are made regarding the volume of the cyclone that varies from standard sizing calculations. More specifically, a cartridge having a diameter of 5.38" and a length of 5.33" (for 5.0" effective length) is used to estimate the initial purge air flow (not including purge volume).

Volume is calculated as $(\pi/4)*d^2*h$ (where d is diameter and h is height). Therefore, volume is $(\pi/4)*(5.38")^2*(5.0")= 113.7\ in^3$. It is assumed that packing material (e.g., desiccant) consumes about ½ of the volume and, therefore, the volume is $½*(113.7\ in^3)=\sim57\ in^3$ at 130 psi gauge (psig). Standard volume is calculated as $57\ in^3*((130\ psig+14.7)/14.7)=561.0\ in^3$ ($0.325\ ft^3$) at atmospheric pressure (where 14.7 is atmospheric pressure). Therefore, it is assumed $0.325\ ft^3$ represents the amount of air that is expelled during initial purge of the air dryer. If $0.325\ ft^3$ represents the volume released in 1.0 second, flow is $0.325\ ft^3/sec$ (60 sec/min)=19.5 standard cubic feet per minute (scfm).

With reference to FIG. 6, various cyclone dimensions are presented for an input flow rate of 19.5 with an inlet velocity of 50 fps and a gas density of 0.0740 pcf. The "Inlet ht" and "Inlet width" correspond to the inlet port 24, 24" (see FIGS. 1 and 4). The "Outlet length" and "Outlet dia" correspond to the outlet tube 26, 26" (see FIGS. 1 and 4). The "Cylinder ht" and "Overall ht" correspond to the inlet chamber 22, 22" (see FIGS. 1 and 4), With reference to FIG. 7, ranges for various parameters are provided for both a 0.5 sec initial purge duration and a 1.0 sec initial purge duration. The "slot width", "slot, length", and "slot area" correspond to the inlet port 24, 24" (see FIGS. 1 and 4), The "cyclone inside diameter", "cyclone length", and "cyclone volume" correspond to the inlet chamber 22, 22" (see FIGS. 1 and 4), While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A method for processing a purge exhaust, the method comprising:
   receiving the purge exhaust in an inlet chamber; passing a portion of the purge exhaust including at least one of moisture, air and oil from the inlet chamber to a sump volume; changing a phase of the moisture from liquid to gas; venting the moisture in the gas phase to atmosphere; and wicking the oil from the sump volume to an oil collector.

2. The method for processing a purge exhaust as set forth in claim 1, wherein changing the phase of the moisture includes:
   heating the moisture.

3. The method for processing a purge exhaust as set forth in claim 1, further including:
   dripping the oil onto the oil collector.

4. The method for processing a purge exhaust as set forth in claim 1, further including:
   transferring the oil from the oil collector for recycling the oil.

5. The method for processing a purge exhaust as set forth in claim 1, further including:
   transferring the oil from the oil collector to at least one of a compressor and an engine.

6. The method for processing a purge exhaust as set forth in claim 1, further including:
   swirling the purge exhaust within the inlet chamber to separate the at least one of the moisture and the oil from the air of the purge exhaust.

7. A method for processing a purge exhaust, the method comprising:
   receiving the purge exhaust in an inlet chamber;
   separating at least one of moisture and oil from the purge exhaust by swirling the purge exhaust in the inlet chamber;
   passing the at least one of the moisture and oil from the inlet chamber to a sump volume;
   changing the moisture from a liquid phase to a gas phase in the sump volume;
   venting the moisture in the gas phase from the sump volume to atmosphere; and
   wicking the oil from the sump volume to an oil collector.

8. A method for processing a purge exhaust, the method comprising:
   receiving the purge exhaust in an inlet chamber;
   passing a portion of the purge exhaust including at least one of moisture, air and oil from the inlet chamber to a sump volume;
   heating the moisture, thereby changing the phase of the moisture from a liquid to a gas;
   venting at least one of the air and the moisture in the gas phase to atmosphere; and
   wicking the oil from the sump volume to an oil collector.

* * * * *